United States Patent Office 3,248,349
Patented Apr. 26, 1966

3,248,349
CELLULAR POLYURETHANE PLASTICS PREPARED FROM A TALL OIL ESTER
John F. Szabat, New Martinsville, Paul G. Gemeinhardt, Sistersville, and William C. Darr, New Martinsville, W. Va., assignors to Mobay Chemical Company, Pittsburgh, Pa., a corporation of Delaware
No Drawing. Filed May 3, 1962, Ser. No. 193,063
7 Claims. (Cl. 260—2.5)

This invention relates to polyurethane plastics and more particularly to cellular polyurethane plastics which tend to have a rigid structure with good physical properties.

It has been proposed heretofore to prepare cellular polyurethane plastics by reacting a resinous material containing active hydrogen containing groups with an organic polyisocyanate in the presence of a blowing agent. In order to make the rigid structure desirable for insulation and the like, it is essential that at least three free active hydrogen containing groups be present in the resin molecule for reaction with a diisocyanate.

It has been proposed heretofore to use vegetable oil esters for the production of urethane modified drying oils which are suitable for the production of non-cellular coating compositions. The urethane modified drying oils have excellent properties but not all of those which are suitable for making coatings are suitable for the production of cellular polyurethane plastics. When the vegetable oil is condensed with the polyhydric alcohol having three or four hydroxyl groups, the resulting polymer is not sufficiently hydrophobic to make good insulation. Moreover, where the vegetable oil is condensed with a polyhydric alcohol containing seven or eight hydroxyl groups such as tripentaerythritol, the resulting liquid is too viscous to be mixed with the organic polyisocyanate to produce a cellular structure. It has also been proposed heretofore to include tall oil in the reaction mixture leading to the production of a cellular polyurethane plastic. Tall oil contains free carboxyl groups which react with the organic polyisocyanate to yield carbon dioxide and amide linkages. It is very uneconomical to use the organic polyisocyanate for reaction with these free carboxylic groups to produce carbon dioxide. The cellular polyurethanes can be much more economically expanded with low boiling substances such as the halohydrocarbons and the like.

It is therefore an object of this invention to provide cellular polyurethane plastics based on hydrocarbon acids such as tall oil acid which have been condensed with polyhydric alcohols. Another object of this invention is to provide improved tall oil esters for reaction with an organic polyisocyanate to prepare a cellular polyurethane plastic. Still another object of this invention is to provide esters based on hydrocarbon acids and polyhydric alcohols which have a satisfactory viscosity for mixing with an organic polyisocyanate to prepare a cellular polyurethane plastic and which produce cellular polyurethane plastics with improved hydrophobic characteristics and low moisture permeability. Still another object of this invention is to provide an improved method of preparing cellular polyurethane plastics based on tall oil esters.

The foregoing objects and others which will become apparent from the following description are accomplished in accordance with the invention, generally speaking, by providing cellular polyurethane plastics which are prepared by reacting an organic polyisocyanate with the reaction product of an hydrocarbon acid having from 12 to 26 carbon atoms condensed with a polyhydric alcohol having at least 5 hydroxyl groups and preferably 5 to 8 hydroxyl groups in the presence of a blowing agent. It is preferred to react the hydrocarbon acids with the polyhydric alcohol having 5 to 8 free hydroxyl groups to such an extent and in such proportions that the resulting ester contains at least two of the fatty acid molecules linked to the polyhydric alcohol having 5 or 6 free hydroxyl groups leaving a product which contains a plurality of free hydroxyl groups and preferably at least 3 free —OH groups. The preferred esters have an hydroxyl number of from about 150 to about 700 and a molecular weight of about 300 to about 1100.

In accordance with a preferred embodiment of this invention, a polyhydric alcohol having 5 to 6 free hydroxyl groups is reacted with tall oil to prepare an ester which is then reacted with an organic polyisocyanate in the presence of a blowing agent to produce the cellular polyurethane plastics of the invention. It is particularly desirable to use tall oil which contains from about 15 percent to about 35 percent by weight of rosin acids for reaction with the polyhydric alcohol containing 5 or 6 free hydroxyl groups to yield a tall oil ester which has an hydroxyl number of from about 150 to about 250 and a viscosity of from about 50,000 to about 100,000 cps. at 25° C. Any suitable hydrocarbon acid may be used which contains from about 12 to about 26 carbon atoms such as, for example, myristic acid, pentadecanoic acid, palmitic acid, margaric acid, stearic acid, nonadecanoic acid, arachidic acid, heneicosanoic acid, behenic acid, tricosanoic acid, tetracosanoic acid, pentacosanoic acid, hexacosanoic acid, abietic acid, phenanthrenebutyric acid, pimeric acid and the like. One may also use mixtures of these acids as well as mixtures thereof with other substances. A particularly suitable mixture of acids is the substance known as "tall oil" which is obtained in the manufacture of cellulose from pine wood. The acids in this mixture are mainly oleic acid, linoleic acid and the like but the important constituent is abietic acid as set forth above. It is preferred to use tall oil which contains from about 15 percent to about 35 percent of rosin acids such as abietic acid.

Any suitable polyhydric alcohol containing at least 5 free hydroxyl groups may be used such as, for example, pentitol, mannitol, sorbitol, triphentaerythritol, and the like as well as the alkylene oxide condensates of these polyhydric alcohols having at least 5 hydroxyl groups and which have a molecular weight below about 1500 and most preferably below about 1000. Thus, one may use, for example, the adduct of sorbitol with propylene oxide which has an hydroxyl number of about 628 and a molecular weight of about 540, the ethylene oxide condensate of mannitol which has an hydroxyl number of about 900 and a molecular weight of about 370, the propylene oxide adduct of sucrose which has a molecular weight of about 848 and an hydroxyl number of about 530 and the like as well as other alkylene oxide condensates of polyhydric alcohols having at least 5 free hydroxyl groups.

It is also possible to use the tall oil esters of the invention in combination with other organic compounds containing active hydrogen containing groups as determined by the Zerewitinoff method such as, for example, hydroxyl polyesters obtained from dicarboxylic acids and dihydric alcohols, polyhydric polyalkylene ethers, polyhydric polythioethers, polyacetals N,N,N',N'-2-dihydroxy (loweralkyl)ethylene diamine and the like. Any suitable organic polyisocyanate may be used such as, for example, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''- triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4- and 20 percent 2,6-toluylene diisocyanate or 4,4'-diphenylmethane diisocyanate.

Any suitable mixture of the afore-mentioned isocyanates as well as unrefined or crude isocyanates may also be used. For example, crude toluylene diisocyanates can be obtained by the phosgenation of a mixture of toluylene diamines and crude diphenylmethane diisocyanates can be obtained by the phosgenation of crude diphenylmethane diamine, the reaction product of aniline and formaldehyde in the presence of HCl. A preferred unrefined or crude isocyanate is one having from about 26 to about 33 percent free —NCO and an amine equivalent of from about 120 to about 150, such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted wtih the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance of crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4-toluylene diamine and 20 percent 2,6-toluylene diamine containing 90 percent of a mixture of about 80 percent 2,4-toluylene diisocyanate and 20 percent 2,6-toluylene diisocyanate and the balance polymers incapable of accurate analysis.

It is an essential feature of the invention that esters of hydrocarbon acids containing 12 to 26 carbon atoms and polyhydric alcohols having at least 5 hydroxyl groups be used for reaction with the organic polyisocyanates because those esters which are prepared from polyhydric alcohols which have from 3 to 4 hydroxyl groups do not yield a sufficiently rigid structure and do not have sufficient hydrophobicity to be useful as thermal insulation and the like. The rigid cellular polyurethane plastics of the invention, partly as a result of their lower moisture permeability, have improved properties as insulation even under highly humid conditions and thus are useful for the production of both sound and thermal insulation as well as building materials such as wall panels and the like.

It is often desirable in the production of the cellular polyurethane plastics of the invention to include a foaming stabilizing substance such as, for example, sulphonated castor oil, dimethyl polysiloxanes or alkyl silane oxyalkylene block copolymers having the formula

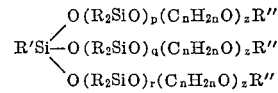

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

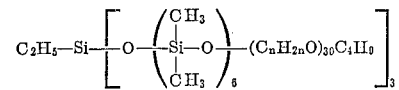

wherein $(C_nH_{2n}O)$ is a mixed polyoxyethylene and oxypropylene block copolymer containing about 17 oxyethylene units and about 13 oxypropylene units.

It is also often desirable to include a catalyst in the reaction mixture such as, for example, a tertiary amine such as N-ethyl morpholine, N-methyl morpholine, diethyl ethanolamine, N-coco morpholine, 1-methyl-4-dimethylamino ethyl piperazine, dimethylbenzyl amine, triethylene diamine and the like as well as metal catalysts and particularly the organo tin catalysts such as, for example, dibutyl tin di-2-ethyl hexoate, dibutyl tin dilaurate, stannous octoate, stannous oleate and the like.

Of course it is necessary to have a blowing agent in order to produce a satisfactory cellular structure. The blowing agent may be water which will react with an organic polyisocyanate to produce carbon dioxide and thus cause expansion of the resinous structure as it is formed. But, it is preferred to use a low boiling compound which causes expansion of the resinous material as it is formed because this is more economical than using the expensive diisocyanate to generate carbon dioxide and also, in most cases, the gas is entrapped and itself serves as an insulating material. This is particularly true where the halohydrocarbons are used such as, for example, dichlorodifluoromethane, trichlorofluoromethane and the like. It is possible to use other blowing agents such as, for example, difluorochloroethane, difluorobromoethane, difluorodibromomethane, difluorodichloroethane, difluoro-1,2-dichloroethylene, trifluorotrichloroethane, diethyl ether, pentane and the like.

The invention is further illustrated by the following example in which the parts are by weight unless otherwise specified.

*Example*

About 1000 parts of the reaction product of sorbitol with propylene oxide which has an hydroxyl number of about 628 are added to about 1000 parts of crude tall oil sold under the trade name, "Emtall 907," containing about 28.7 percent rosin acids, 34.4 percent fatty acids, acid number 122, saponification value 143 and having 17 percent unsaponifiables. The resulting mixture is stirred and heated from about 28° C. to about 203° C. over a period of about 1.5 hours and thereafter maintained at a temperature of from about 195° C. to about 225° C. for about 2½ hours. The temperature in the reflux column throughout this 2½ hour heating period is within the range of from about 202° C. to about 236° C. Heating is continued for another 2 hours and the reaction temperature gradually drops to about 178° C. Thereafter the substance is placed under a vacuum to pull off the water of esterification. The reaction mixture is cooled to about 143° C. over a one-hour period so that the total reaction time is about 5.5 hours. Finally, the reactants are heated from about 240° C. to about 265° C. over 1.5 hours to complete esterification. The resulting product has an hydroxyl number of about 159, an acid number of about 4.5 and a viscosity of about 75,000 cps. at 25° C.

About 75 parts of this tall oil ester are mixed with about 25 parts of N,N,N',N'-2-hydroxypropyl ethylene diamine and then combined with about 77 parts of a crude 4,4'-diphenylmethane diisocyanate mixture containing about 30 percent —NCO and an amine equivalent of 141, said mixture being obtained by phosgenating the reaction product of aniline with formaldehyde, about 1 part of a silicone oil having the formula

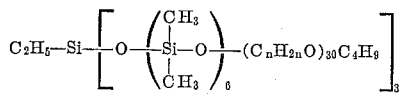

wherein $(C_nH_{2n}O)$ is a mixed polyoxyethylene and oxypropylene block copolymer containing about 17 oxyethylene units and about 13 oxypropylene units, and about 25 parts of trichloromonofluoromethane. The reaction mixture begins to foam after about 1 minute and a substantially rigid cellular polyurethane plastic is obtained. The cellular polyurethane plastic has the following physical properties:

| | |
|---|---|
| Density, lbs./ft.$^3$ | 2.0 |
| Closed cells _____percent | >90 |
| Compression strength at yield, p.s.i. | 20 |
| K factor | 0.13 |

It is to be understood that any other suitable acids, alcohols, polyisocyanate or the like could be used in the foregoing working example if the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A cellular polyurethane plastic prepared by a process which comprises reacting in the presence of a blowing agent, an organic polyisocyanate with an ester having an hydroxyl number of from about 150 to about 250 which has been obtained by a process which comprises reacting tall oil with a polyhydric alcohol having from 5 to 8 free hydroxyl groups.

2. A cellular polyurethane plastic prepared by a process which comprises reacting an organic polyisocyanate with an ester having a viscosity of from about 50,000 to about 100,000 centipoises at 25° C. and an hydroxyl number of from about 150 to about 250 which has been obtained by a process which comprises reacting tall oil containing from about 15 percent by weight to about 35 percent by weight of rosin acids with a polyhydric alcohol containing from 5 to 8 free hydroxyl groups in the presence of a blowing agent.

3. A cellular polyurethane plastic obtained by a process which comprises reacting an organic polyisocyanate obtained by a process which comprises phosgenating the reaction product of aniline and formaldehyde having from about 26 to about 33% free —NCO and an amine equivalent of from about 120 to about 150 with a polyester obtained by a process which comprises reacting a tall oil containing from about 15 percent by weight to about 35 percent by weight of rosin acids with a polyhydric alcohol having a molecular weight below about 1000 and containing from 5 to 8 free hydroxyl groups until a polyester having an hydroxyl number within the range of from about 150 to about 250 and a viscosity within the range of from about 50,000 to about 100,000 cps. at 25° C. is obtained in the presence of a blowing agent selected from the group consisting of halohydrocarbons and water.

4. The cellular polyurethane plastic of claim 3 wherein said blowing agent is a halohydrocarbon.

5. The cellular polyurethane plastic of claim 3 wherein said polyhydric alcohol has 5 to 6 hydroxyl groups.

6. The cellular polyurethane plastic of claim 3 wherein said polyhydric alcohol is propoxylated sorbitol.

7. The cellular polyurethane plastic of claim 3 wherein said rosin acids are abietic acids.

References Cited by the Examiner
UNITED STATES PATENTS

| | | | |
|---|---|---|---|
| 2,812,337 | 11/1957 | Culemeyer | 260—404 |
| 2,970,062 | 1/1961 | Hauge et al. | 106—123 |
| 3,047,540 | 7/1962 | Merten et al. | 260—2.5 |
| 3,095,386 | 6/1963 | Hudson | 260—2.5 |
| 3,138,562 | 6/1964 | Nischk et al. | 260—2.5 |

FOREIGN PATENTS 816,413    7/1959    Great Britain.

LEON J. BERCOVITZ, *Primary Examiner.*